United States Patent [19]
Rozon

[11] Patent Number: 5,589,292
[45] Date of Patent: Dec. 31, 1996

[54] PORTABLE BOOSTER BATTERY

[75] Inventor: Luc Rozon, St-Luc, Canada

[73] Assignee: Booster Pac International Corporation, St-Jean-sur-Richelieu, Canada

[21] Appl. No.: 287,840

[22] Filed: Aug. 9, 1994

[30]   Foreign Application Priority Data

Oct. 25, 1993 [CA] Canada .................................. 2109166

[51] Int. Cl.$^6$ .................................................. H01M 2/06
[52] U.S. Cl. ........................... 429/170; 429/65; 429/166; 429/178; 429/179; 429/180; 429/181; 429/187; 439/503; 439/504; 439/754; 439/763; 439/764
[58] Field of Search ............................. 429/65, 166, 170, 429/178–179, 180–181, 187; 439/503, 504, 754, 763, 764

[56]   References Cited

U.S. PATENT DOCUMENTS

| | | |
|---|---|---|
| 2,610,987 | 3/1951 | Betz ........................................ 429/121 |
| 2,718,540 | 9/1955 | Betz . |
| 4,037,720 | 7/1977 | McGurk ................................. 206/328 |
| 4,161,682 | 7/1979 | Corvette . |
| 4,350,746 | 9/1982 | Chambers . |
| 4,983,473 | 1/1991 | Smith ................................. 429/121 X |
| 5,183,407 | 2/1993 | Srol . |
| 5,214,368 | 5/1993 | Wells . |

*Primary Examiner*—M. Nuzzolillo
*Attorney, Agent, or Firm*—McGlew and Tuttle

[57]   ABSTRACT

In a tool for boosting (jump starting) a vehicle, it is know that there is a battery as a power source and booster cables to bring the energy to the engine. In this invention, the battery and the cables are incorporated into one unit which includes the battery, the cables and protective holsters (housing) to lodge the cables. The holsters are an integral part of the unit and swivel at 90° (degrees) to permit easy access. In this way, everything can be carried in one hand. Also, because the unit can be easily placed close to the engine, the cables can be much shorter than regular booster cables. It is easier to use since there are only two connections to make instead of four. Finally, the holsters, which house the booster clips protect the user from short circuits.

20 Claims, 3 Drawing Sheets

PORTABLE BOOSTER BATTERY

FIELD OF INVENTION

The present invention relates to batteries and more specifically to batteries that are moved from location to location, to connect to different devices, especially discharged or dead batteries of motor vehicles.

BACKGROUND OF THE INVENTION

Most automobiles are presently powered by an internal combustion engine which must be spun up to speed externally before they can operate. The engines are usually spun up to speed by an electric motor that is powered by a battery. The battery is then charged by a generator connected to the engine once the engine is operating or running. The battery is usually able to store enough charge for the periods that the engine is not running in order to start the engine when needed.

When the battery does not have sufficient charge to start the engine, a way must be found to recharge the battery or bypass the battery with a separate charge. Since very often a discharged battery is caused by an external drain such as leaving the lights on or playing the radio, once the engine is started by either recharging the battery or bypassing it by sending a separate charge the automobile will continue to operate properly.

Since there are many things that will temporally cause a battery to lose its charge, the need to recharge or bypass batteries with separate charges is common. Very often another or booster battery is brought to the vicinity of the dead battery and electrical cables are used to connect the booster battery to the dead battery in parallel in order to recharge and/or bypass the dead battery. This often known as boosting or jump starting the dead battery or engine.

In this method of boosting, the cables are disconnected from the batteries after each use so as to prevent short circuits. This method and structure however, is cumbersome since there are at least two parts and they demand great attention since there are 4 connections to make and a bad connection in either one will result in a short circuit or failure to start the engine.

Some manufacturers have tried to resolve the problem by combining the battery and cables in one unit. The problems that have arisen with these units are that the cables which are permanently connected to the battery are always live so they have to be protected as to not touch each other. The amount of amperage available in these batteries is very large and if the cables touch each other it would create a short circuit and damage the cables and batteries. To isolate the live cables, some manufacturers have used protective pouches. These are not practical to use since they are often in the way when trying to boost. Also it is time consuming to put the cables in and out of the pouches.

Other manufacturers have incorporated a male cigar lighter plug at the end of the cables permitting the user to plug this into the female cigar lighter plug of the vehicle. The problem with this unit is that one can only use this tool on vehicles equipped with female cigar lighter plugs. Also, since the plugs almost always have a maximum amperage rating of 30 amps and that most starter motors draw much more than 30 amps., the capacity is not adequate.

SUMMARY AND OBJECTS OF THE INVENTION

It is any object of the present invention to provide a portable booster battery which can be easily carried to a car with a dead battery and connected to the dead battery of the car in order to provide sufficient charge to start the engine. It is also an object of the present invention to make the portable booster battery easy to use, maintain and safe from electrical short circuits which could damage the battery, the cables and the surrounding environment.

The present invention achieves these objectives by providing an electrical energy storage device such as a sealed non spillable battery inside a housing. Cables are connected to the terminals of the battery and extend outside the housing. On the ends of these cables are battery or booster clamps which are designed to clamp on and electrically connect to the terminals of the dead battery or any other part of electrical system of the automobile. When the cables and the battery clamps are not being used, the battery clamps can be positioned inside holsters that are connected to the housing. The holsters cover the battery clamps and block the battery clamps from electrically contacting the surrounding environment. In this way the clamps are protected when they are not in use, and this prevents electrical short circuits from occurring which would damage property.

Inside the holsters is positioned a bit means for connecting with the battery clamp when the clamps are positioned inside the holsters. A groove can also be formed in the housing to retain the cables close to the housing. The entire unit then becomes very compact and easy to transport. A handle can also be provided in the housing.

The holsters can be pivotably attached to the housing by a least 90°, in order to make it easier to insert and remove the battery clamps. The holsters each include a cover which is rounded and closed at one end and flat and open at another substantially opposite end.

A recharging connection or plug can be connected to the energy storage device and either positioned on the housing or extending from the housing in order to recharge the storage device. In a preferred embodiment, the recharging connection is a male cigar lighter plug which can be plugged into the cigar lighter of an automobile in order to recharge. An accessory connection can also be provided on the housing to electrically connect to accessories such as 12 volt lights, vacuum cleaners and compressors in order to power these devices. This accessory connection is preferably a female cigar lighter. A display means is also preferably connected to the energy storage device and positioned on the housing to display how much charge the energy storage device contains.

Another object of the present invention is to provide a unit which simple in design, rugged in construction, and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DETAILED DESCRIPTION OF THE PREFERRED EMBODIMENTS

Figure 1:
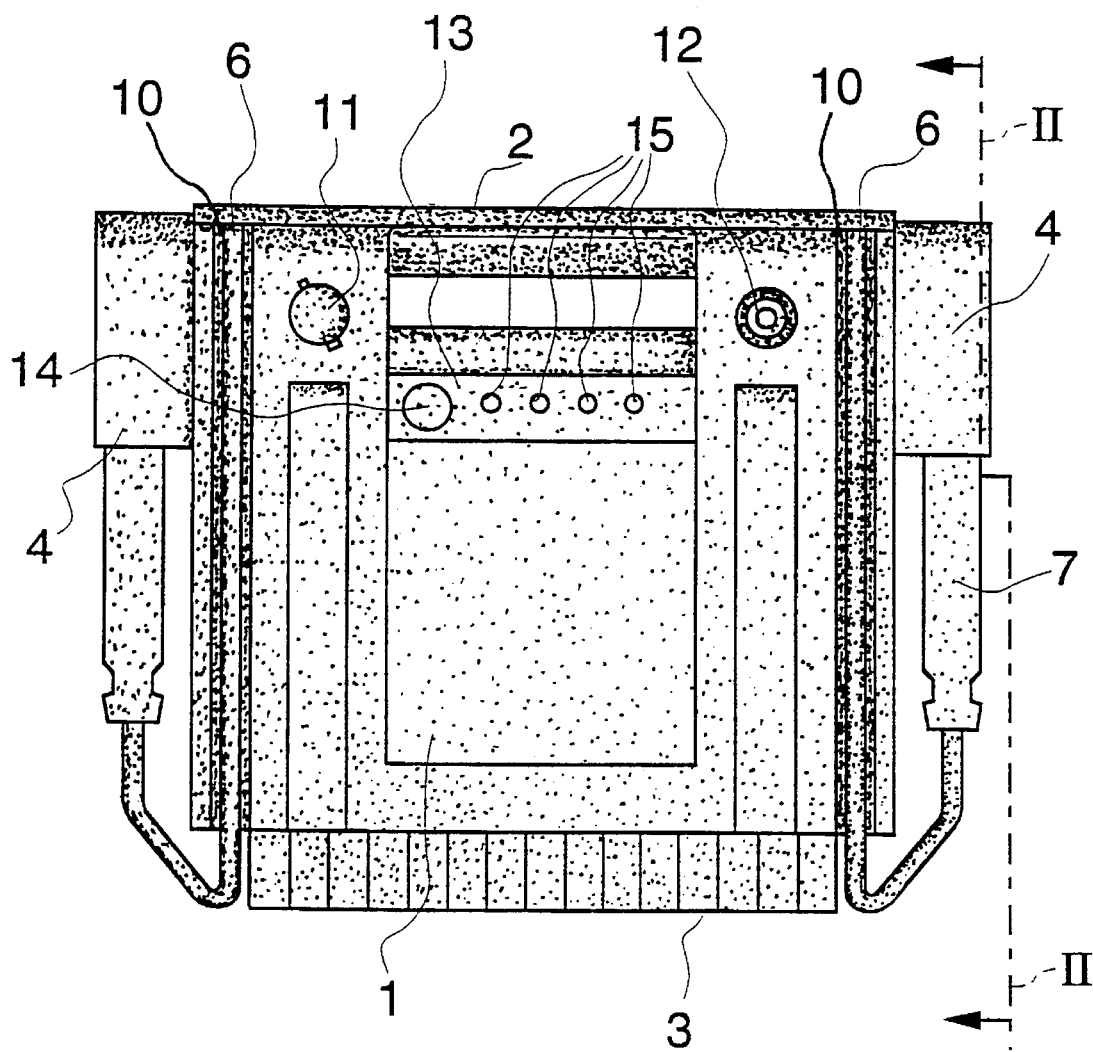
FIG. 1 is a plan view of the present invention.

Referring to the drawings, in particular FIG. 1, the unit comprises of a housing 1 which is preferably made out of plastic. Inside the housing 1 is the electrical storage device which is preferably a sealed non-spillable battery. First and second electrical cables 6 are connected to terminals of the battery inside the housing 1. The cables 6 extend outside the housing and are preferably held to the housing by grooves 10 when the cables are not in use.

Figure 2:
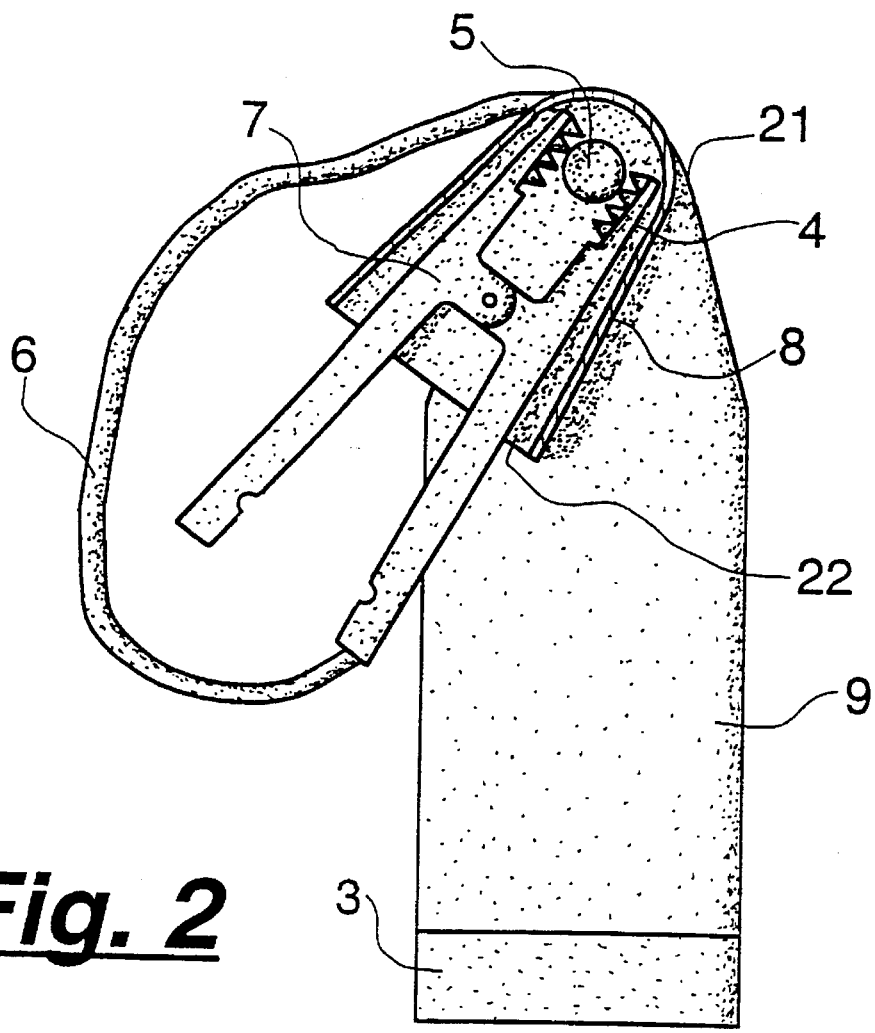
FIG. 2 is a partial cross sectional side view according to section line II—II of FIG. 1 and with the holster pivoted approximately 30°.
Figure 3:
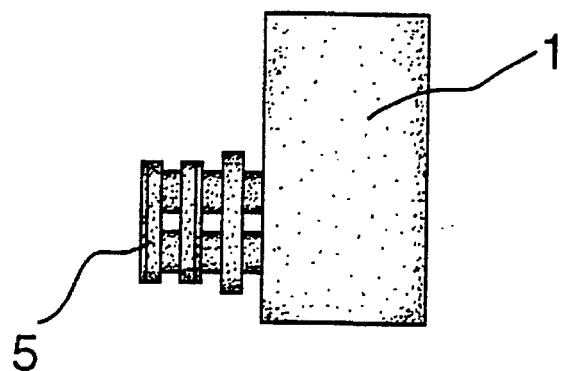
FIG. 3 is a view of the bit means without the cover of the holster and with a portion of the housing.

At the other end of the cable 6 from the battery which is inside the housing 1, are clamp means 7 for electrically connecting the cable to the terminals of a dead battery or portions of an electrical system. As can be seen in the drawings, especially FIGS. 1 and 2, the housing has a box-like shape. First and second dimensions of the box-like shape are of a size that is roughly or approximately similar to the two largest dimensions of the clamp means 7.

Holster means 4 are preferably positioned on opposite sides of the housing 1. The holster means 4 includes a cover 8 which is rounded at one end and opened at another end 22. The holster means 4 also includes bit means 5 for connecting with the clamp means 7 when the clamps means is inside the holster means 4. The cover 8 is made of non-electrically conductive material and is preferable that the bit means 5 and the housing 1 are also non-conducting. The holster means 4 is pivotably connected to the housing 1 by at least 90°. This allows easier insertion and removal of the clamps means 7 independent of the position of the housing 1. The bit means 5 is preferably positioned in substantially the middle of the holster with regard to the length of the housing 1.

The unit also can have a recharging connection 12 for charging the energy storage device. Preferably this recharging connection 12 is male cigar lighter plug which can extend from the housing 1 in order to plug into the cigar lighter receptacle of an automobile. An accessory power connection 11 is also provided for a powering accessories with the unit. This accessory connection 11 is preferably a female cigar lighter receptacle and can be used power such equipment as portable lights, invertors, compressors, vacuum cleaners and refrigerators.

In order to determine the amount of charge in the energy storage device, the present invention has a display means 13 which displays the present charge of the device. The preferred embodiment the display means consist of a test button 14 and indicator lights 15.

To use the unit, one puts the housing 1 close to the engine one wishes to boost, either on its bottom 3 or on its back side 9. Next one pivots the holster 4 to the desired angle, opens the clamp 7, and removes the clamp 7 from the holster. The positive clamp is connected to the positive post of the battery one wishes to boost, the negative clamp is connected to a good ground of the engine. The engine, is then started. To use the booster as a power supply, the male cigar plug of any 12 volt accessory is plugged into the female cigar plug on the unit.

Figure 4:
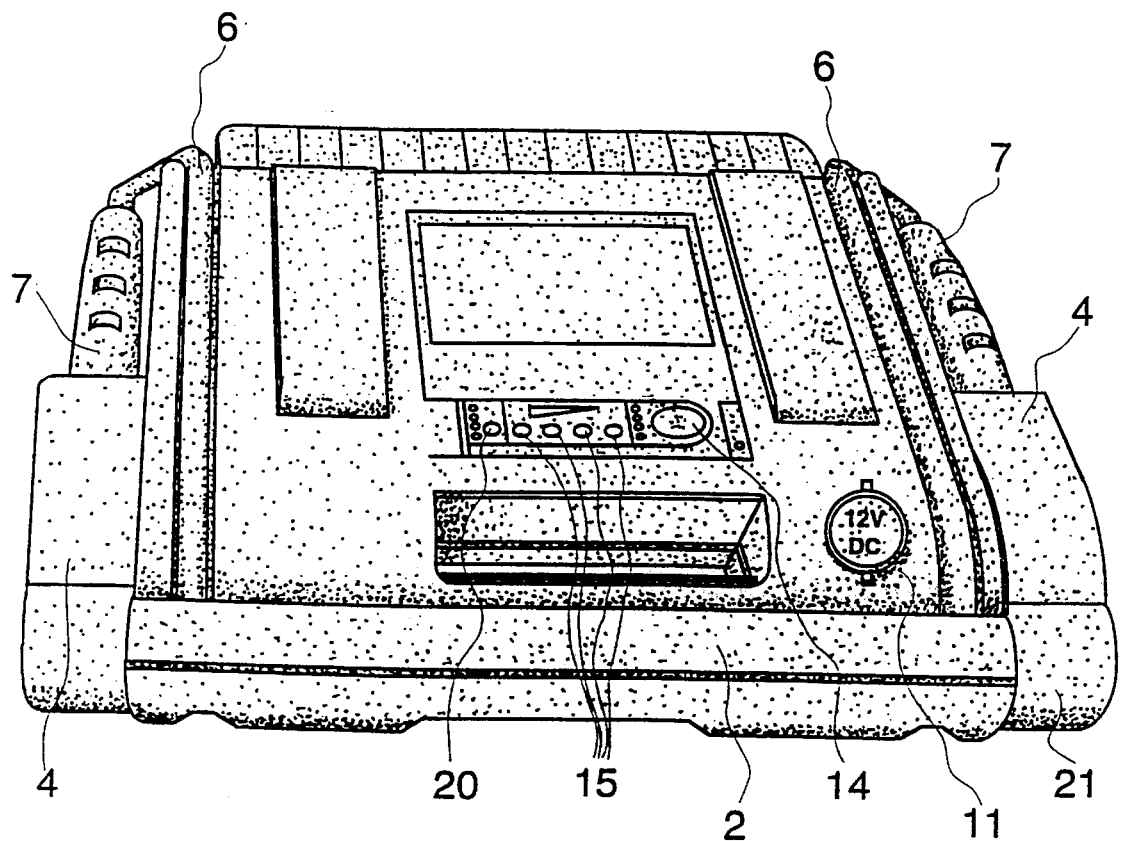
FIG. 4 is a perspective view of another embodiment of the invention.
Figure 5:
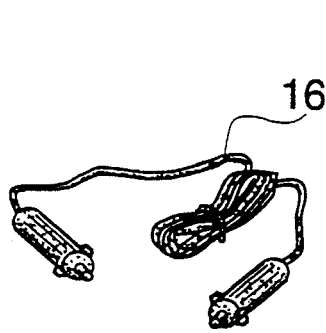
FIG. 5 is a view of one recharging plug.
Figure 6:
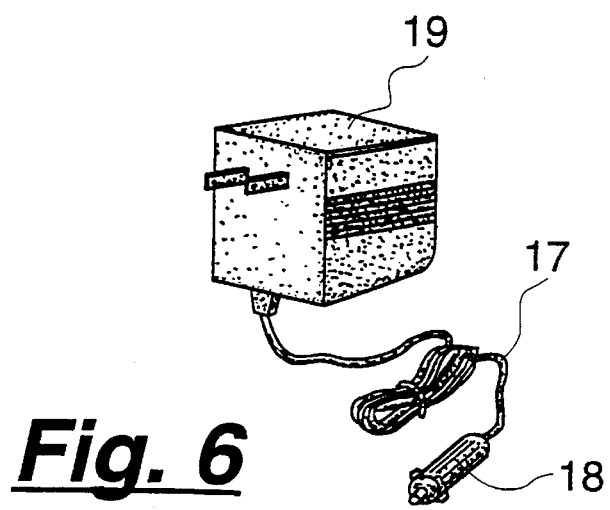
FIG. 6 is a view another recharging plug.

In another embodiment of the present invention, as shown in FIG. 4, the recharging connection can also be the same as the accessory connection 11. A special recharging plug 16 as shown in FIG. 5, or 17 as shown in FIG. 6, is connected to the accessory connection 11. With the recharging plug 16 of FIG. 5, one end is plugged into the accessory connection 11, and the other end is plug into the female cigar lighter receptacle in an automobile. With the recharging plug 17 of FIG. 6, the male cigar lighter plug 18 is plugged into the accessory connection 11 and the other end has a wall outlet plug 19 which is plugged into a wall outlet. The embodiment of FIG. 4 also has a recharging light 20 indicating that the battery is recharging.

While specific embodiments of the invention have been shown and described in detail to illustrate the application of the principles of the invention, it will be understood that the invention may be embodied otherwise without departing from such principles.

What is claimed is:

1. A portable automobile booster battery comprising:

a sealed non-spillable battery having a positive terminal and a negative terminal;

a housing surrounding said battery and covering said terminals of said battery;

a first cable with one end permanently connected to said positive terminal of said battery, said first cable extending outside said housing;

a second cable with one end permanently connected to said negative terminal of said battery, said second cable extending outside said housing;

first clamp means connected to another end of said first cable and for electrically connecting said first cable to a positive terminal of an automobile battery;

second clamp means connected to another end of said second cable and for electrically connecting said second cable to one of a negative terminal of said automobile battery and a ground of an automobile;

a first holster means connected to an outside of said housing, and for holding said first clamp means outside of said housing;

a second holster means connected to an outside of said housing, and for holding said second clamp mean outside said housing.

2. A battery in accordance with claim 1, wherein:

said first and second holster means each include a bit means positioned inside respective said first and second holster means, said bit means being for connecting with and holding respective said first and second clamp means when said respective first and second clamp means are positioned inside said respective first and second holster means.

3. A battery in accordance with claim 2, wherein:

said bit means has a shape to simulate said positive and negative terminals of said automobile battery, each said bit means being clamped onto by respective said first and second clamp means in a manner similar to said first and second clamp means connecting to said terminals of said battery.

4. A battery in accordance with claim 2, wherein:

said first and second clamp means apply a clamping force to connect to respective positive and negative terminals of said automobile battery and said bit means.

5. A battery in accordance with claim 1, wherein:

said first and second holster means are pivotably connected to said housing.

6. A battery in accordance with claim 1, further comprising:

cable retention means for holding said first and second cables to said housing when said first and second clamp means are positioned inside respective said first and second holster means, said cable retention means is a groove with projections to engage said first and second cables defined by said housing.

7. A battery in accordance with claim 1, wherein:

said first and second holster means each include a cover which is rounded and closed at one end, and flat and opened at another substantially opposite end.

8. A battery in accordance with claim 1, further comprising:

a recharging plug extending from said housing and electrically connected to said positive and negative terminals of said sealed nonspillable battery.

9. A battery in accordance with claim 8, wherein:

said recharging connection is a male cigar lighter plug.

10. A battery in accordance with claim 1, further comprising:

a female cigar lighter receptacle means electrically connected to said sealed nonspillable battery and for powering accessories.

11. A battery in accordance with claim 10, further comprising:

a recharging plug connectable to said female cigar lighter receptacle on one end.

12. A battery in accordance with claim 11, wherein:

said recharging plug has one of a male cigar lighter plug and a wall outlet plug on another end.

13. A battery in accordance with claim 1, further comprising:

display means connected to said sealed nonspillable battery and for indicating a charge condition of said sealed nonspillable battery.

14. A battery in accordance with claim 1, wherein:

said housing completely surrounds said battery;

said first holster means is connectable to and disconnectable from said first clamp means when said housing surrounds and covers said first and second terminals of said battery, said second holster means is connectable to and disconnectable from said second clamp means when said housing surrounds and covers said first and second terminals of said battery.

15. A battery in accordance with claim 1, wherein:

said first and second holster means receive and cover said first and second clamp means respectively, said first and second holster means blocking said first and second clamp means respectively from electrical contact when said first and second clamp means are inside said first and second holster means respectively.

16. A battery in accordance with claim 1, further comprising:

a handle positioned on a handle side of said housing, said first and second holster means being positioned on opposite lateral sides of said housing, said opposite lateral sides being adjacent said handle side, said first and second holsters means being positioned on portions of said opposite lateral sides adjacent said handle, and said first and second holsters means being spaced from a side of said housing opposite said handle side.

17. A battery in accordance with claim 1, wherein:

said housing includes a handle means for lifting and carrying said housing, said housing with said handle being a rigid unit.

18. A battery in accordance with claim 1, wherein:

said housing having a box-like shape, first and second dimensions of said box-like shape having magnitudes approximately similar to a two largest dimensions of said clamp means.

19. A battery in accordance with claim 18, wherein:

said first and second holster means are positioned on substantially opposite sides of said housing, said sides being formed by said first and second dimensions of said box-like shape.

20. A portable booster battery comprising:

an electrical energy storage device having first terminal and a second terminal;

a housing surrounding said battery and covering said terminals;

a first cable with one end permanently connected to said first terminal of said electrical energy storage device and said housing;

a second cable with one end permanently connected to said second terminal of said electrical energy storage device and said housing;

first clamp means connected to another end of said first cable and for connecting to a first terminal of an electrical system;

second clamp means connected to another end of said second cable and for connecting to a second terminal of said electrical system;

a first holster means connected to an outside of said housing, and for receiving and covering said first clamp means, said first holster means blocking said first clamp means from electrical contact when said first clamp means is inside said first holster means;

a second holster means connected to an outside of said housing, and for receiving and covering said second clamp means, said second holster means blocking said second clamp means from electrical contact when said second clamp means is inside second holster means.

* * * * *